US008230738B2

(12) United States Patent
Radziszewski et al.

(10) Patent No.: US 8,230,738 B2
(45) Date of Patent: Jul. 31, 2012

(54) DATA COLLECTING DEVICE FOR DETECTING ACCELERATION AND RATE OF CHANGE IN ATTITUDE

(75) Inventors: Peter Radziszewski, Montréal (CA); Wei Li, Montréal (CA); Coleman Benson, Dollard-Des-Ormeaux (CA); Sudarshan Martins, Montréal (CA); Tapiwanashe Chenje, St. Lazare (CA)

(73) Assignee: McGill University, Montreal (CA)

( * ) Notice: Subject to any disclaimer, the term of this patent is extended or adjusted under 35 U.S.C. 154(b) by 615 days.

(21) Appl. No.: 12/374,575

(22) PCT Filed: Jul. 20, 2007

(86) PCT No.: PCT/CA2007/001296
§ 371 (c)(1),
(2), (4) Date: Sep. 24, 2009

(87) PCT Pub. No.: WO2008/009133
PCT Pub. Date: Jan. 24, 2008

(65) Prior Publication Data
US 2010/0024518 A1    Feb. 4, 2010

Related U.S. Application Data

(60) Provisional application No. 60/807,999, filed on Jul. 21, 2006.

(51) Int. Cl.
*G01P 15/00* (2006.01)
*G01P 3/00* (2006.01)
*G01P 3/04* (2006.01)

(52) U.S. Cl. ............... 73/489; 73/491; 73/495; 73/509; 73/510

(58) Field of Classification Search ............... 73/489, 73/491, 495, 504.03, 509, 510, 514.01
See application file for complete search history.

(56) References Cited

U.S. PATENT DOCUMENTS

| | | | |
|---|---|---|---|
| 4,096,918 A | 6/1978 | Beggs et al. | |
| 5,485,148 A * | 1/1996 | Tseng | 340/10.41 |
| 2003/0178516 A1 | 9/2003 | Washburn et al. | |
| 2003/0200807 A1* | 10/2003 | Hulsing, II | 73/514.01 |
| 2005/0012499 A1* | 1/2005 | La Rosa et al. | 324/207.15 |
| 2006/0272413 A1* | 12/2006 | Vaganov et al. | 73/514.01 |
| 2007/0163325 A1 | 7/2007 | Radziszewski et al. | |
| 2008/0041173 A1* | 2/2008 | Tormoen | 73/866.5 |

* cited by examiner

*Primary Examiner* — Hezron E Williams
*Assistant Examiner* — Nathaniel Kolb
(74) *Attorney, Agent, or Firm* — Goudreau Gage Dubuc; Hugh Mansfield

(57) ABSTRACT

An instrumented ball for collecting data in an industrial mill comprising a durable sphere defining an enclosed cavity and having a substantial thickness, the sphere manufactured from a resilient material able to withstand pressures exerted by a working industrial mill, electronics disposed in the cavity comprising: a plurality of devices for sensing physical conditions inside the mill, wherein each of the sensing devices outputs a series of sensed values, the devices comprising at least an accelerometer, a gyroscope, a thermocouple, a microphone and a wear sensor, a memory for storing the sensed values, and a communication port for transmitting the sensed values to an external device located outside of the mill, and a power source disposed in the cavity for powering the electronics.

28 Claims, 7 Drawing Sheets

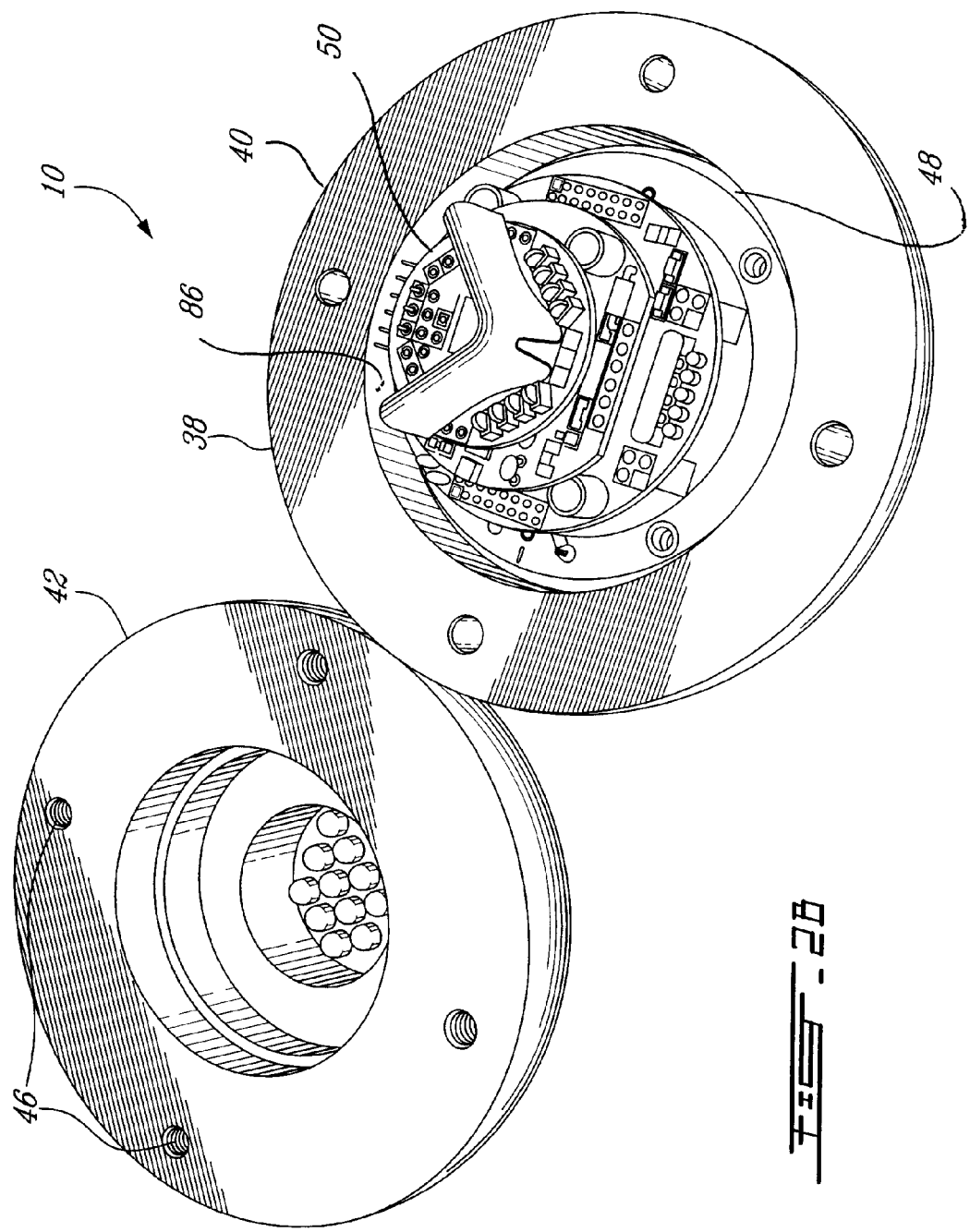

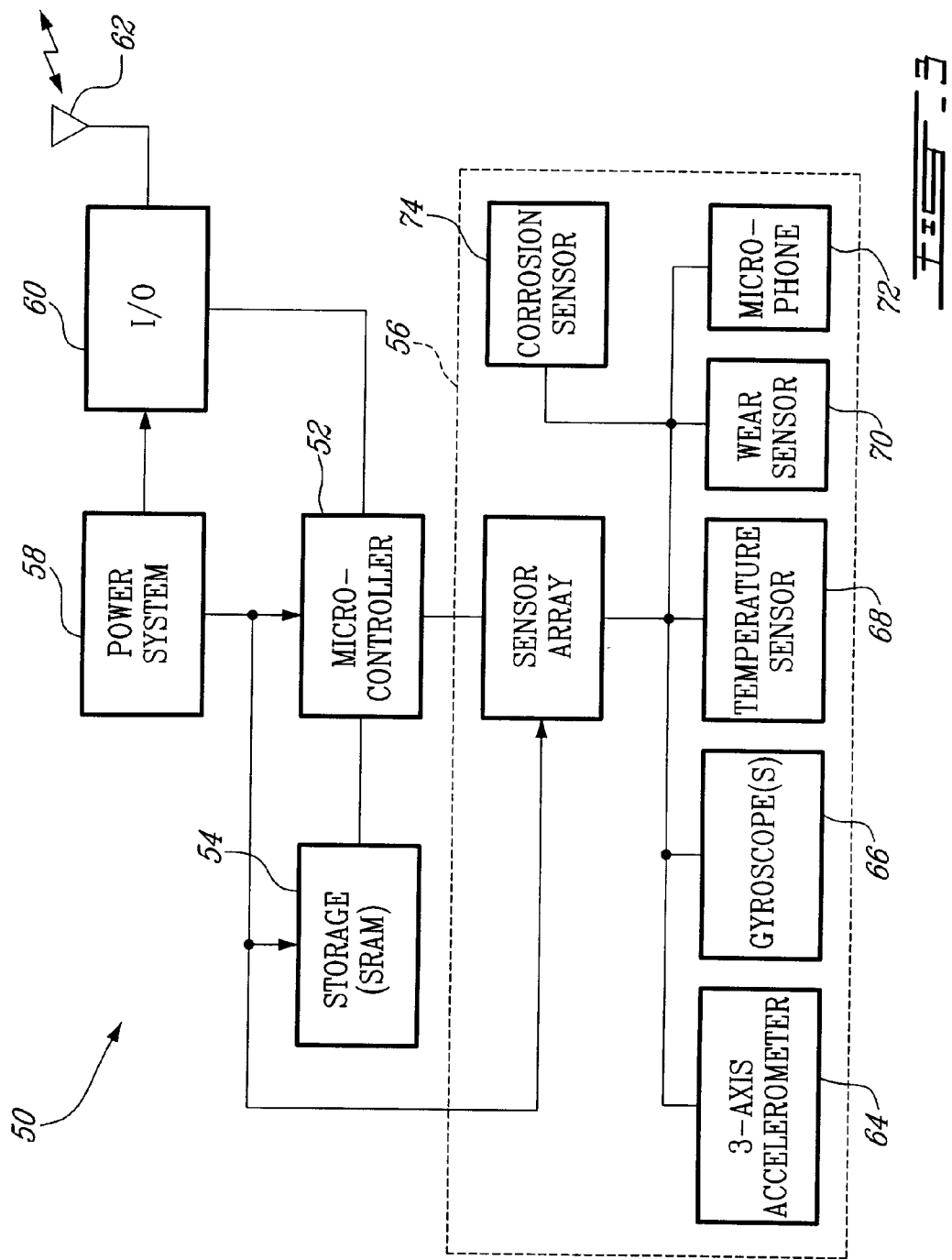

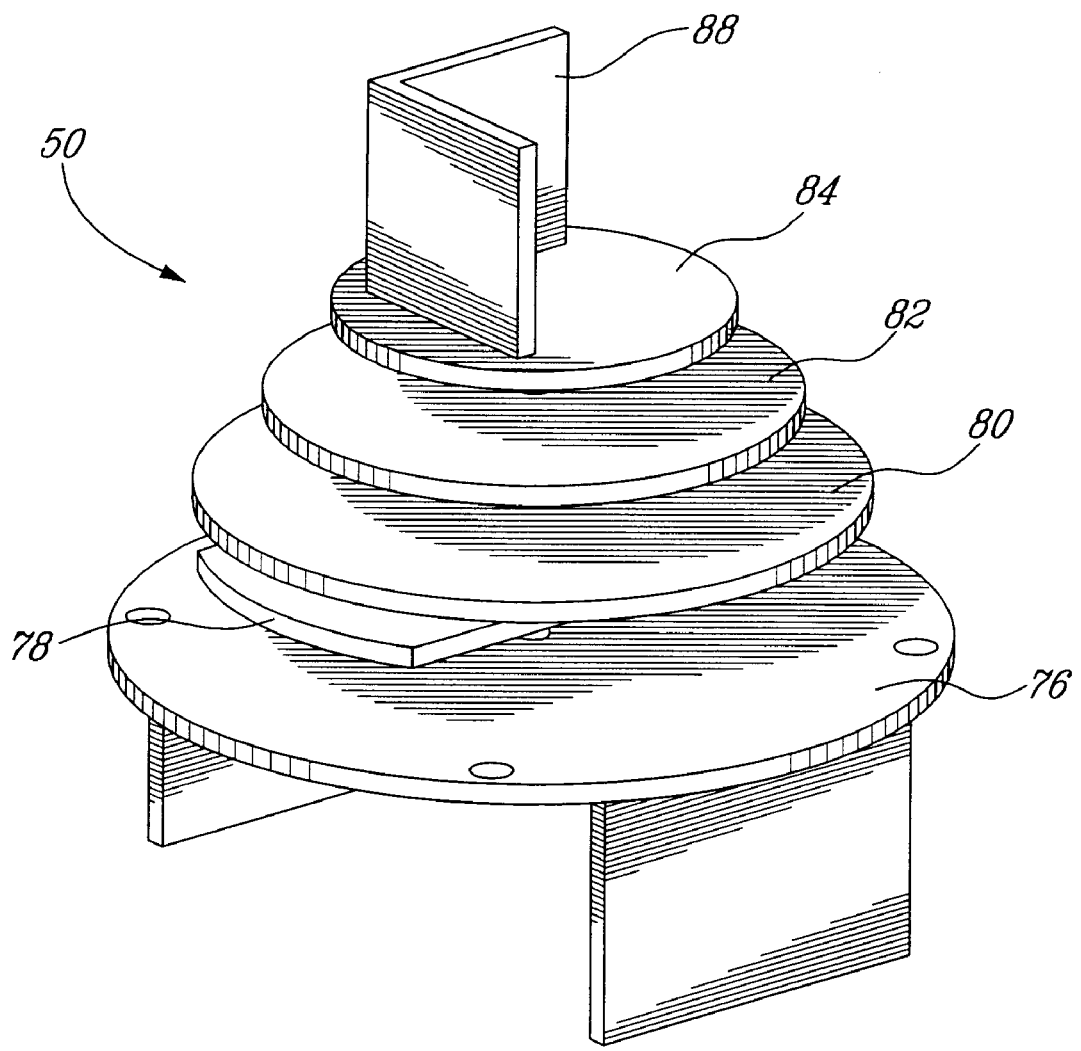

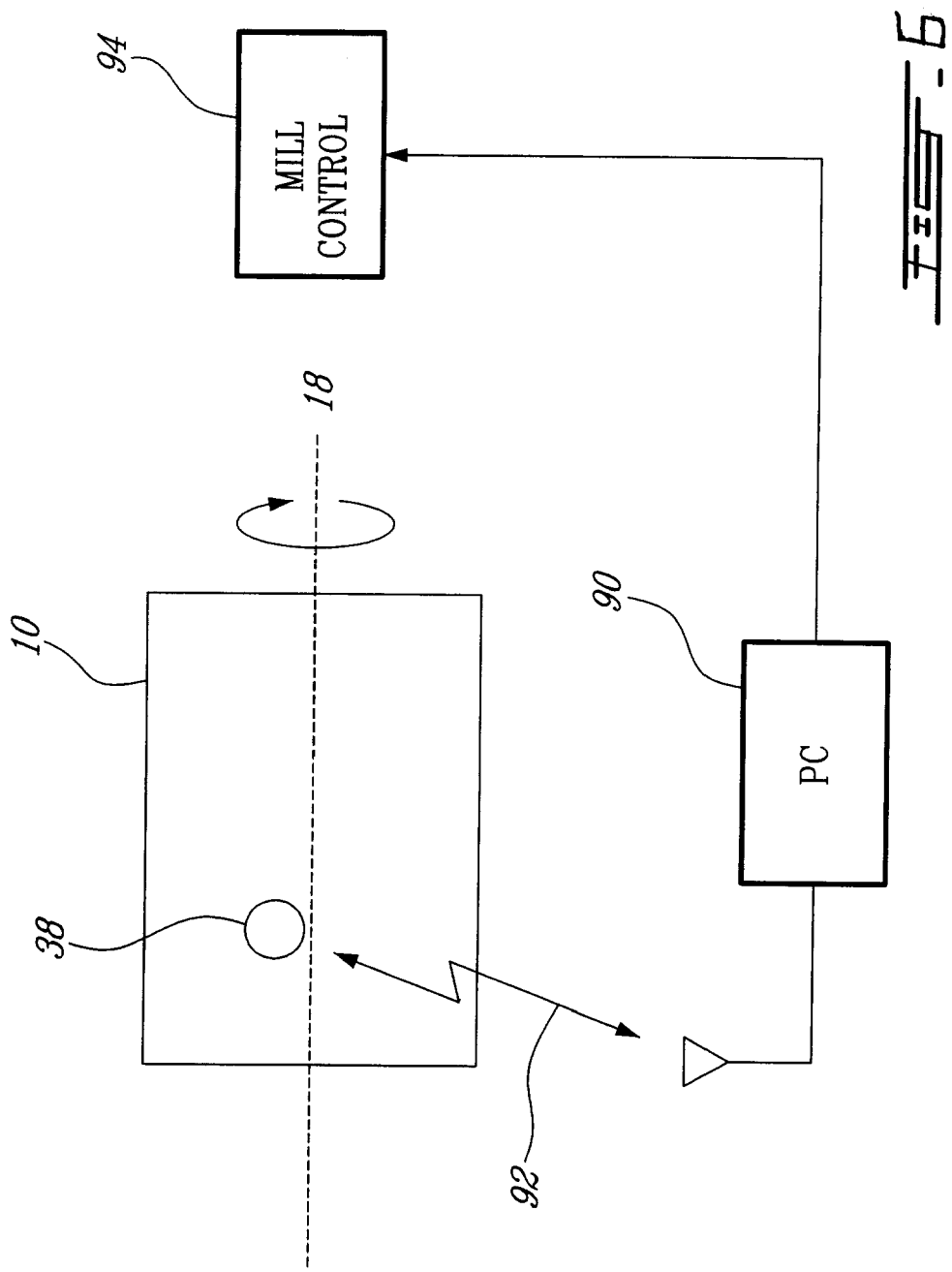

DATA COLLECTING DEVICE FOR DETECTING ACCELERATION AND RATE OF CHANGE IN ATTITUDE

CROSS-REFERENCE TO RELATED APPLICATIONS

This application is a National Entry Application of PCT application no PCT/CA2007/001296 filed on Jul. 20, 2007 and published in English under PCT Article 21(2), which itself claims priority on U.S. provisional application Ser. No. 60/807,999, filed on Jul. 21, 2006. All documents above are incorporated herein in their entirety by reference.

FIELD OF THE INVENTION

The present invention relates to an instrumented ball. More specifically, the present invention is concerned with an instrumented ball capable of recording data from an operating industrial mill charged with an ore.

BACKGROUND OF THE INVENTION

Mining processes involve the transformation of vast amounts of rock in order to extract the valuable metal or mineral. An essential extraction process is comminution, that is the reduction in size by crushing or grinding. Comminution usually requires large machines cost-effectively applying the forces required to comminute the ore. In turn, the machines are subject to large reaction forces. As a consequence, the machines wear. Since large masses of ore are processed, a great deal of energy is required. Thus, the rising costs of energy and of steel, which is used to fabricate the mills, are two factors that are a constant worry for the industry.

The grinding efficiency of semi-autogenous and ball milling depends on the tumbling motion of the total charge within the mill. Utilization of this tumbling motion for efficient breakage of particles depends on the conditions inside the mill. Monitoring to measure the condition inside the mill barrel during operation is difficult due to severe environment presented by the tumbling charge.

It has been possible to contribute to a better understanding of the behavior of these mechanical systems with the advent of prior art discrete element methodology (DEM) charge motion models. The fundamentals behind these models are both very rigorous and sound. Validation of these models in real mills is limited to the measurement and comparison of measurable parameters such as power, throughput and wear. The ball and rock trajectories, the frequency and intensity of collision events (impact and abrasion), the effect of friction on rotation, the roll or slip of the balls and the difference between wet and dry conditions in the mill are all significant aspects effecting the overall frequency of events and the associated effect on breakage and wear that are difficult to evaluate, measure and therefore model and simulate with a view to improve and optimize.

Therefore, there is a need for an information-gathering tool capable of recording events occurring in the mill to study how energy is consumed in a mill and particularly how it is distributed in impact and abrasion energy spectra as well as determine the frequency and intensity of applied forces and moments.

SUMMARY OF THE INVENTION

In order to address the above and other drawbacks there is provided a device for collecting data on an ore within a charged industrial mill charged with the ore. The device comprises a casing defining an enclosed cavity and manufactured from a resilient material able to withstand stresses exerted by a working industrial mill, a sensor package disposed in the cavity, the package for detecting and sampling on an ongoing basis an acceleration and a rate of change in attitude of the object, a real time clock disposed in the cavity for stamping the sampled acceleration and the sampled rate of change in attitude of the object with a sampling time, and a memory disposed in the cavity for storing the sampled acceleration, the sampled rate of change in attitude and the sampling time.

There is also disclosed a system for collecting data on an ore within an industrial mill charged with the ore. The system comprises a computing device located outside the mill, at least one data collecting device placed in the mill, the data collecting device comprising a casing defining an enclosed cavity, the casing manufactured from a resilient material able to withstand stresses exerted by a working industrial mill, a sensor package disposed in the cavity, the package for sampling on an ongoing basis an acceleration and a rate of change in attitude of the object, and a real time clock disposed in the cavity for stamping the sampled acceleration and the sampled rate of change in attitude of the object with a sampling time, and a communications link between the at least one data collecting device. The sampled acceleration, the sampled rate of change and the sampling time are transferred from the data collecting device to the computing device via the communications link.

Also, there is disclosed a method for estimating a path of travel of a durable object within an industrial mill charged with an ore during an estimation period, the method comprising a) determining an initial position of the object within the mill, b) sampling an acceleration and rate of change of attitude of the object and stamping the detected acceleration and the rate of change of attitude with a sampling time, c) predicting a future position of the object using the sampled acceleration and rate of change of attitude and the initial position, d) plotting the future predicted position versus the sampling time, e) replacing the initial position with the predicted future position, and f) repeating b), c), d) and e) repeatedly during the estimation period. The plotted predicted position versus sampling time provides the estimated path of travel of the object.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 2b provides a partially disassembled raised perspective view of the instrumented ball in FIG. 2a;

FIG. 3 provides a schematic diagram of an instrumented ball in accordance with an illustrative embodiment of the present invention;

FIG. 5 provides a raised perspective view of a sensor package for use in an instrumented ball in accordance with an illustrative embodiment of the present invention; and FIG. 6 provides a schematic diagram of a system for collecting data on an ore in an industrial mill in accordance with an illustrative embodiment of the present invention.

DESCRIPTION OF ILLUSTRATIVE EMBODIMENTS

The present invention is illustrated in further details by the following non-limiting examples.

Figure 1:
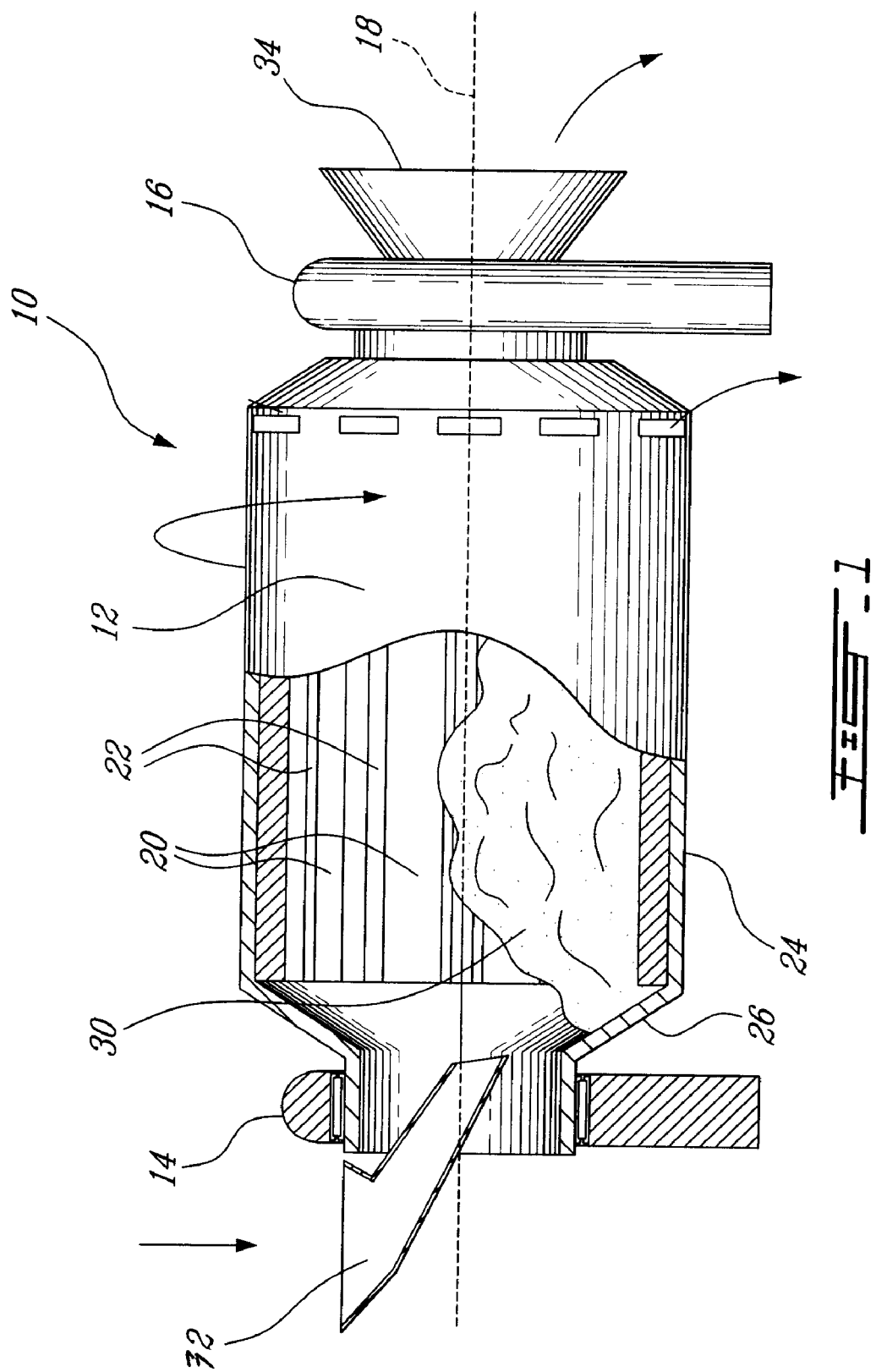
FIG. 1 provides a front plan partial cut-away view of an industrial mill charged with an ore.

Referring to FIG. 1, an illustrative application of the present invention in the mining industry will now be described. As discussed above, one important step in liberating minerals from ore bearing rock is milling the rock. Most ores contain the valuable metals disseminated in a matrix of less valuable rock called gangue. It is therefore necessary to separate valuable minerals from the gangue to yield a product that has a much higher content of the valued material. Following the initial mining step, ore is typically reduced in size by the crushing and/or grinding circuit, and the target mineral is concentrated by various methods. Ore milling typically refers to a specific subset of concentrating operations and is the focus of the present illustrative application.

Still referring to FIG. 1, milling operations typically use a mill (such as a SAG, AG, or ball mill), generally referred to using the reference numeral 10, which is comprised of a large drum (or barrel) 12 suspended at either end by a pair of supports 14, 16. Typical drum diameters range from about two (2) meters to 12 meters. The drum 12 is capable of rotating around its axis 18 which is parallel to the ground. Rotation of the drum 12 is typically provided by a motor and, as necessary, a geared drive or the like (both not shown). The inside surfaces of the drum are lined with liners 20 and lifters 22. The lifters 22 have a raised profile and protrude towards the centre of the drum 12. Lifters 22 along the drums sides are arranged generally longitudinally in parallel with the axis of rotation 18. Lifters 22 along the charging end 26 or discharging end 28 are arranged radially to the axis of rotation 18. Course feedstock ore 30 is fed into the drum 12 by an infeed assembly 32. Rotation of the drum 12 serves to lift the feed stock ore 30 which is then allowed to drop from a significant height.

Three mechanisms cause the breakdown of the feedstock ore 30: impact due to the fall of the ore onto the charge below; attrition of smaller particles between larger grinding bodies; and abrasion (or rubbing off) of particles from the larger bodies. Additionally, steel or ceramic balls may be added as grinding media to the feedstock in order to aid the reduction process by increasing the amount of shocks within the barrel. Milled ore progresses towards along the drum and is discharged via the trunnion 34 or one of a number of peripheral discharges 36.

Figure 2A:
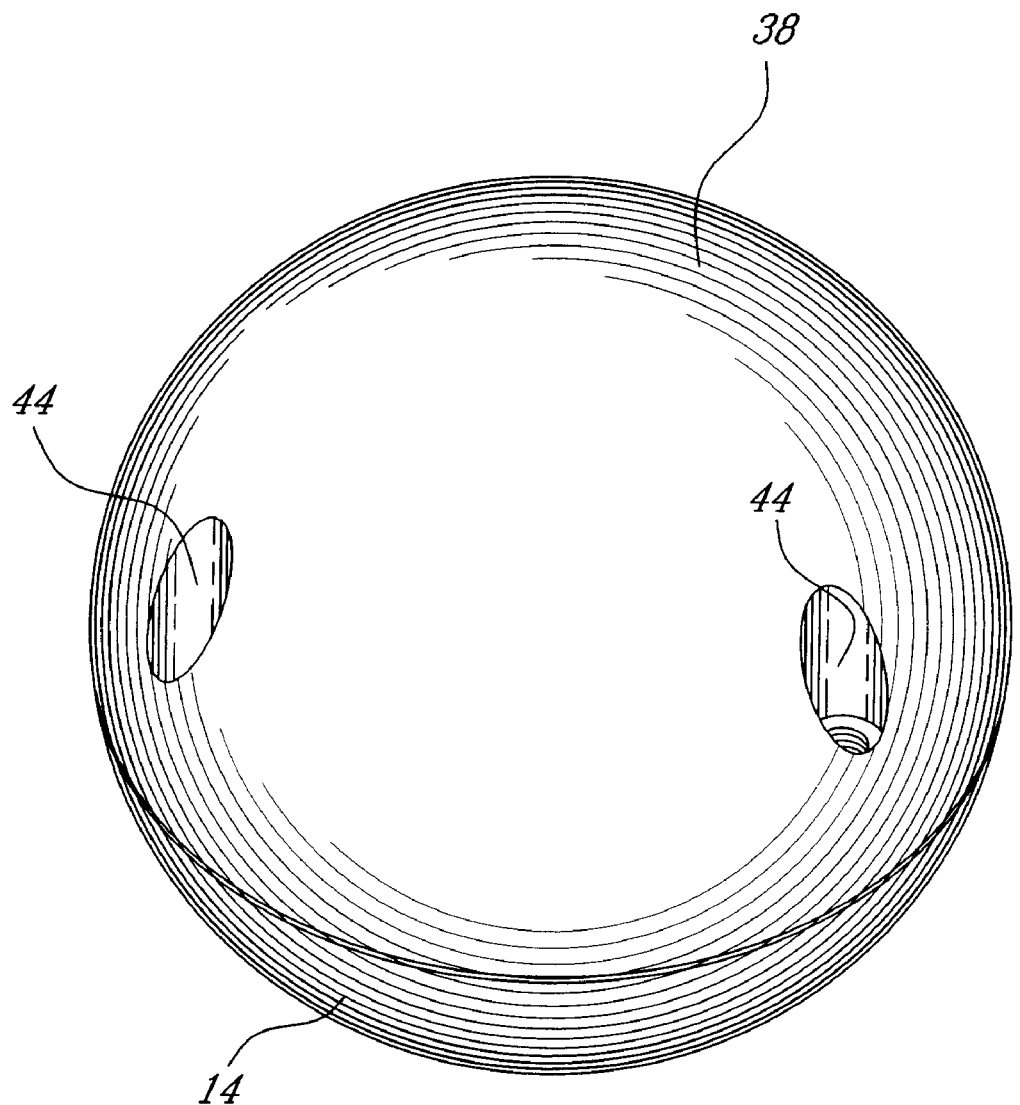
FIG. 2a provides a raised perspective view of an instrumented ball in accordance with an illustrative embodiment of the present invention.

Referring now to FIG. 2a in addition to FIG. 1, in order to collect data regarding the movements and other characteristics of the ore (and the steel ball grinding media, if any) inside the mill 10, an instrumented ball 38 is added to the ore 30 inside the mill 10.

Still referring to FIG. 2a, the size and the weight affect how the instrumented ball 38 interacts with the charge. The ball is illustratively either (i) closely similar to the constituents of the charge or (ii) similar to the grinding media. The shape of the casing of the instrumented ball 38 is also illustratively round with a diameter substantially similar to the diameter of the grinding media used in the mill 10. In the present illustrative embodiment the external diameter of the instrumented ball 38 is of about four inches and may be enlarged or reduced according to the size of the steel ball grinding media added to inside the mill 10.

Alternatively, the shape of the casing of the instrumented ball 38 may be different to simulate rock geometry or in consideration of other parameters (e.g. cube shaped). Non-spherical shell and other shell materials for the instrumented ball 38 may be used without departing from the scope of the present patent application. The finish of the instrumented ball 38 affects the surface forces between the charge and the instrumented ball 38 and therefore the outer surface of the ball 38 may be coated with a different material in order to change the surface properties (although abrasion will constantly renew the surfaces by comminution and therefore care must be taken to ensure that the coating is renewed sufficiently often). Illustratively, the casing of the instrumented ball 38 is provided with a smooth finish.

Referring now to FIG. 2b in addition to FIG. 2a, In the illustrative embodiment the casing of the instrumented ball 38 is comprised of two hemispherical cups 40, 42, which can be manufactured from aluminum, wood, plastic, polyoxymethylene (Delrin™) or other suitably robust materials. The cups 40, 42 are secured together using four (4) bolts (not shown) having their heads hidden in recesses 44 disposed in the upper hemispherical cup 40 which mate with corresponding threaded holes as in 46 machined or otherwise cut in the lower hemispherical cup 42. The casing formed by the assembled cups 40, 42 is strong enough to survive the environment within the mill 10 charged with an ore during operation.

Referring to FIG. 2b, the inner surfaces of the casing formed by the cups 40, 42 is machined to form a cavity 48 which is sized and designed to receive a sensor package 50. As will be discussed in more detail hereinbelow, the sensor package 50 is equipped with a suitable collection of sensors and electronics in order to illustratively provide data vis-à-vis the ball's position as a function of time, its thermal and acoustic environment as function of time and its wear state as function of time. A person of ordinary skill the art will understand that the sensor package 50 can be potted into the cavity 48 using, for example, epoxy or fastened inside the cavity 48 using glue or fasteners or the like. The size of the cavity 48 will vary according to the shape of the sensor package 50 although the thickness of the wall separating the cavity 48 from the outer surface of the ball 38 should be sufficient to protect the sensor package 50 from damage during its journey inside the mill 10, as well as to impart a suitable mass to the instrumented ball 38.

Table 1 summarizes the physical parameters of the instrumented ball of the illustrative embodiment:

TABLE 1

| Property | Value |
|---|---|
| Mass (kg) [calculated] | 1.2049 ± 0.0005 |
| Mass (kg) [measured] | 1.1708 ± 0.0001 |
| Moments of Inertia (kg m$^2$) [calculated] | $\begin{bmatrix} 0.001377 & 0.000003 & 0.000001 \\ 0.000003 & 0.001377 & -0.000001 \\ 0.000001 & -0.000001 & 0.001387 \end{bmatrix}$ all values ± 0.000084 |

Referring now to FIG. 3, the sensor package 50 comprises a variety of sensing and support electronics in order to collect and transmit data regarding the ball's 38 environment, including a micro-controller 52, storage (memory) 54, such as SRAM or the like, an array of sensors 56, a power system 58, illustratively a nine (9) volt battery, for providing the requisite power to the electronic components, and an I/O communication port 60. The I/O communication port 60 is illustratively a wireless communication port which during operation transmits collected data in real time via an antenna 62 to an external device (not shown).

Still referring to FIG. 3, in an alternative embodiment the I/O communication port 60 is a physical interface such as a USB port or the like such that, during operation, data collected by the micro-controller 52 using the array of sensors 56 is stored in the storage 54 for subsequent download to an external device (not shown) at a later time. In this regard, a person of ordinary skill in the art will understand provision must be made for connecting a communications wire (not shown) to the I/O communication port 60, for example by first opening the ball 38 and subsequently connecting the communications wire to a suitable interface (not shown).

Still referring to FIG. 3, the array of sensors 56 is illustrated as connected to the micro-controller 52 to collect data during a data acquisition period when inside an operating mill 10. In this regard a variety of different sensors may be provided. For example, a three-axis Microelectromechanical (MEM) accelerometer 64 senses the movement variations of the instrumented ball 10. Three (3) MEM single-axis gyroscopes 66 provide reference of the instrumented ball 38 (although not shown, a three-axis gyroscope would also be encompassed by the present invention). A temperature sensor 68 comprised of a thermocouple senses the temperature of the environment in which the instrumented ball 38 finds itself. A wear sensor 70 measures the wear state of the instrumented ball (an illustrative example of a suitable wear sensor, with requisite modifications, is described in detail in the International Application published under No. WO 2205/083411 an entitled METHOD AND DEVICE FOR SENSING WEAR and included herein by reference). Additionally, a microphone 72 is provided to measure the local acoustic field for providing information, for example, on the impact frequency near the instrumented ball 38.

Still referring to FIG. 3, a corrosion sensor 74 is provided for in situ measurement of corrosion within the operating mill 10. As known in the art, corrosion is strongly dependant on the environment and external measurements can only provide a rough approximation of the actual environment inside the operating mill 10. In this regard, the corrosion sensor 74 illustratively measures the corrosion rate of the outer surface of the instrumented ball 38.

Referring to FIGS. 2a and 2b in addition to FIG. 3, by fabricating the casing formed by the cups 40, 42 out of different materials, such as steel alloys or the like, provision is made for in situ testing of these materials. This could be used, for example, to aid in verification of the suitability of materials for use in other parts of the mill 10, for example the liners or lifters (both not shown) which typically suffer greatly from both abrasive and corrosive forces within the mill 10, or as grinding media (also not shown). Wear of the material used to fabricated the casing of the instrumented ball 38 can be measured independent of the wear due to abrasive forces within the operating mill 10.

Figure 4:
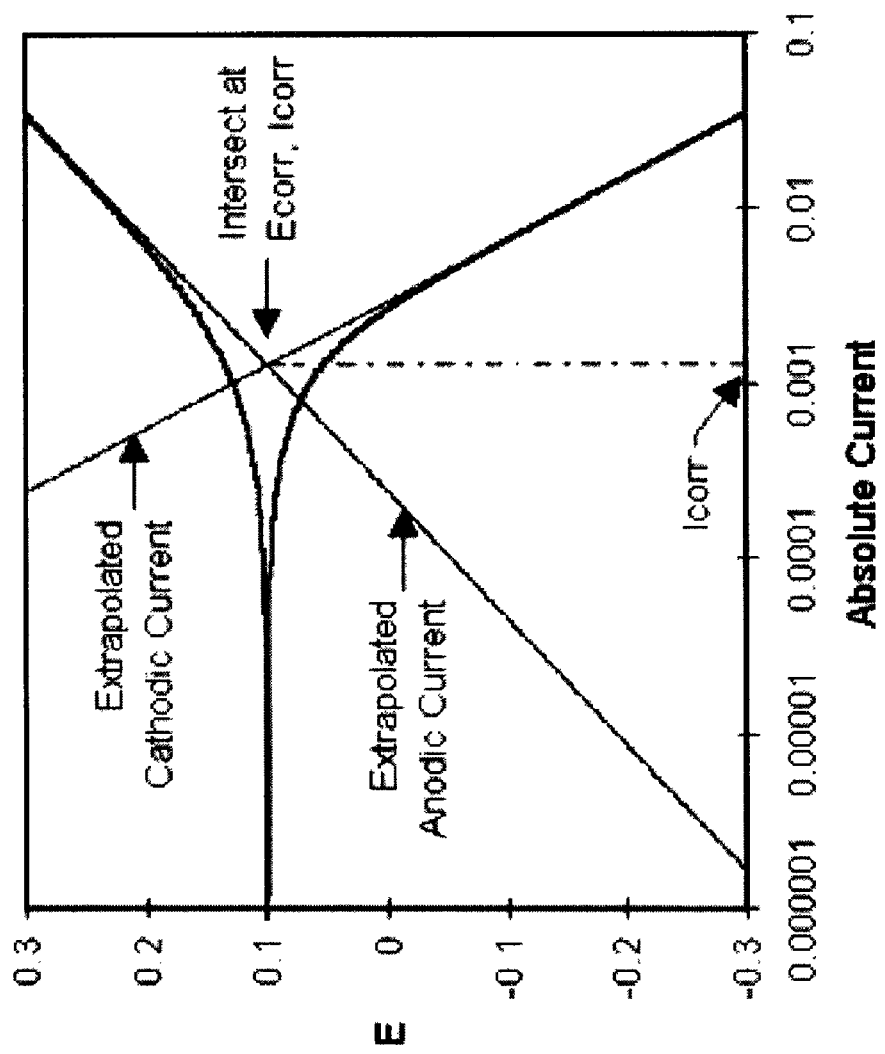
FIG. 4 provides an example of a classic Tafel Plot.

The corrosion rate can illustratively be measured by insulating the cups 40, 42 from one another and controlling and measuring the potential difference between them. Positive and negative potentials relative to the open circuit potential are applied across the two ball cups 40, 42 with the two curves obtained representing the anodic and cathodic reactions. The applied potential can then be plotted against the log of the measured current in a classic Tafel plot, an example of which is given in FIG. 4. The value of either the anodic or cathodic current at $E_{corr}$ is the Corrosion Current, $I_{corr}$, which can then be used to calculate the corrosion rate of the material from which the cups 40, 42 are fabricated. The usual methods can be applied to transform the corrosion current into a corrosion rate, for example those discussed in ASTM Standard G 102, Standard Practice for Calculation of Corrosion Rates.

A person of ordinary skill in the art will understand that to assemble multiple instruments (accelerometer 64, gyroscope 66, thermocouple 68, wear sensor 70, microphone 72 and corrosion sensor 74) as well as the requisite electronics (Microcontroller, I/O, storage, power) into a sensor package 50 which fits into the cavity 48 poses a challenge. Filters, Analog to Digital Converters (ADC) and I/O that allow the use of all instruments are added in the design of a package robust enough to survive the environment and collect the desired data while drawing minimal power from the power system 58. The design must also provide enough functionality such that several operating modes (for example sample, wait and sample, sleep, transmit data) can be used.

In this regard, modern microcontrollers (or microprocessors) provide one basis to respond to such a challenge. The microprocessor found in the illustrative embodiment is a PIC18F8720 (or 8620/8520) having the following technical specifications: Voltage Range: 2.0 V~5.5 V; Converter: 16/10-bit; Max frequency: 25 MHz; Max External Memory: 2M×16 bit and supports RS232 and I$^2$C. The micro-controller 52 is coupled with several other components, illustratively amplifiers, voltage references, DC-DC converters, real-time clock, wireless receiver and transmitter operating at 433 MHz, RS232 Interface, and adequate SRAM for collecting samples.

Table 2 summarizes some of the electronic components used in the present illustrative embodiment.

TABLE 2

| | |
|---|---|
| Input: | 8 Analog Signals |
| Sensor 1 (accelerometer) | 3 Analog Signals |
| Sensor 2 (gyro) | 3 Analog Signals |
| Sensor 3 (temperature) | I$^2$C Serial interface (AD7414) |
| Sensor 4* (microphone) | 1 Analog Signals |
| Output: | 8-bit Data, Date to PC |
| Max Sample Rate: | 4000 Hz |
| Supply: | 3.3 V Battery |
| Min Working Time: | 5~10 mins |
| Real-Time Clock | Yes |
| Min Volume: | 3" × 3" × 3" |
| Local Storage | SRAM array |

Referring back to FIG. 2b, a single electronic board, even with only the smallest surface mount design, would typically be too large to fit into the cavity 48 of the instrumented ball 38. In order to overcome this limitation, a 3-D circuit was designed to maximize the use of the volume of the sensor package 50 by using different superposed layers for placement within the cavity 48 of the instrumented ball 38. In this regard the electronics are formed in layers, each layer insulated from the other.

Referring now to FIG. 5 in addition to FIG. 2b, the sensor package 50 is implemented on a series of discrete Printed Circuit Boards (PCBs)/circuits as in 76, 78, 80, 82 and 84 arranged in a circular pyramidal shape which conforms substantially to the shape of the inner surface 86 of the cavity 48. Illustratively, the first or lower layer 76 is a power subcircuit, the second layer 78 is the storage array subcircuit, the third layer 80 is the micro-controller subcircuit including the micro-controller, clock and the serial and wireless I/O ports, the fourth layer 82 and top, or fifth, layer 84 comprises the sensor subcircuit including, on the fourth layer 82, the accelerometer and the temperature sensors, and on the fifth layer 84, the gyroscope sensors 88.

In operation, the acceleration the instrumented ball 38 is subject to can reach about 2000 G (where 1 G=9.81 m/s$^2$). To protect the circuit damping elements such as rubber washers may be necessary around the fasteners holding the subcircuits, as well as a conformal filler. Both elements act as shock absorbers without harming the electronics and without corrupting the collected data. To prevent any risks of electrical shorting problems, the inner surface 86 of the cavity 48 is illustratively lined with non-conductive coating such as insulating tape. The metallic casing provided by the cups 40, 42 additionally provides electromagnetic shielding for the sensor package.

The system clock allows all data collected by the instrumented ball to be time stamped. In addition, the clock can be used to regulate the sampling frequency. Although the maximum sampling rate of the illustrative embodiment is 4 kHz, initial tests were completed at a frequency of 300 Hz. The storage array allows the instrument to save the collected data. At a sampling frequency of 300 Hz, the instrumented ball 10 is able to collect data over a period of approximately 30 minutes. At a sampling rate of 4 kHz, the instrumented ball 38 can collect and store data for about two (2) minutes.

Referring back to FIG. 3, the core of the data acquisition is the micro-controller 52. Digital and analog data acquisition ICs are connected to the micro-controller 52 in addition to the instruments. To save the data, SRAM ICs are connected to the micro-controller. Serial and wireless I/O communication systems 60 are connected to the micro-controller 52. With provision of an appropriate software, the micro-controller 52 can be instructed to collect, save and transmit any data collected during the data collection period. For instance, the micro-controller 52 can be programmed with a delay before beginning recording data so that the user has adequate time to place the instrumented ball 38 within the mill. This saves valuable recording time between the moment the ball is programmed and the moment it begins to gather data in the mill. The electronic system can perform additional tasks by changing the micro-controller 52 instructions.

Using the data collected by the sensor package, the position, kinetic energy, rotational energy and potential energy of the instrumented ball 38 can be determined according to known principles, as well as the forces and the moments acting on the instrumented ball 38. The temperature sensor 68 is used to offset any thermal effects on the instruments and can also be used to detect the local temperature, which, in turn, can be used to estimate the thermal energy. The microphone 72 measures the local acoustic field. This measurement allows for the estimation of the local acoustic energy. In this regard, the acoustic data provides a measure of energy loss within the charge and the rate at which interactions between particles in the charge or the charge and grinding media occur. Since the mill 10 is a machine that transforms shaft power into a surface energy rate (increasing), that is it is a machine that breaks up material, any other energy output by the mill 10, such as acoustic or thermal energy, is a loss. As a result, energy lost in the form of heat and sound waves is undesirable. Using acoustic data, machine losses dues to generated noise can be estimated and analyzed in order to improve understanding of the processes in action within the mill 10. Additionally, losses due to generated noise (and heat) occur whenever there is an interaction. Reduction in the temporal spacing between subsequent interactions leads to a more powerful acoustic signal. By examining the generated signal above an appropriate threshold, the generation of signals due to local (that is, close to the instrumented ball 38) interactions can be determined and analyzed. For example, by counting the number of peaks in the detected acoustic data, a measure of how many interactions occur within a small region can be determined. By raising the threshold, a smaller region can be examined. As a result, the acoustic data can illustratively be used to provide an analysis of how many interactions per second occur as the ball moves within the charge.

When coupled with a simulation, these estimated values can be used to refine the model. If a real-time model is used, on-the-fly optimization of the model is also possible. When the improved model optimizations are fed back to the mill, real-time calibration and tuning of mill operations become possible.

Referring now to FIG. 6, in operation once placed within the mill 10, the electronics of the sensor package 50 within the instrumented ball 38 illustratively communicate with a computer (PC) 90 located outside the mill 10 illustratively via a wireless RF transmission path 92. Referring to FIG. 3 in addition to FIG. 6, as known in the art, provided the initial location of the instrumented ball 38 is known at a given point in time, the telemetry data in the form of inertial acceleration and rate of change in attitude (roll, pitch and yaw) provided by the accelerometers and the gyroscopic sensors can be used to predict a future (or next) position of the instrumented ball 38 and therefore the path followed by the instrumented ball 38. In this regard the acceleration and rate of change in attitude are sampled periodically. The data collected by the instrumented ball permits the determination of several physical quantities. Firstly, the accelerometer readings can be related to inertial values by using the following equation (see e.g. H Goldstein, *Classical Mechanics*, 2$^{nd}$ Ed. Addision Wesley Publishing Co., New York, 1980):

$$a_{inertial}=a_{body}+\omega\times\omega\times r+\dot{\omega}\times r \qquad (1)$$

Where $a_{body}$ is provided by the accelerometers 64 and $\omega$ is provided by the gyroscopes 66. To use equation (1), the rotation that transforms the body axes to the laboratory inertial axes must be found (see M. Shuster, A Survey of Attitude Representations, *The Journal of the Astronautical Sciences*, 41(4):439-517, October-December 1993, which is incorporated herein in its entirety). The rotation, represented by the quaternion q is governed by:

$$\dot{q} = \frac{1}{2}\Omega q \qquad (2)$$

where $\Omega$ is defined by:

$$\Omega = \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix} \qquad (3)$$

As the outer shell of the ball will be subject to wear, the mass and the inertial moments of the ball are a function of the ball radius R and must be estimated. As stated above, the ball 38 consists of a cavity 48 housing the sensor package 50 surrounded by a protective casing. Therefore, the mass and moments of inertia are:

$$m_{ball}=m_{sensor\_package}+m_{casing} \qquad (4)$$

$$I_{ball}=I_{sensor\_package}+I_{casing} \qquad (5)$$

Once the values of the inertial acceleration and the mass of the ball have been determined, the force acting on the ball is:

$$F_{ball} = m_{ball} \cdot a_{inertial} \quad (6)$$

The position and velocity of the ball 38 can then be found by solving the following equations:

$$\dot{v}_{inertial} = a_{inertial}(t) \quad (7)$$

$$\dot{x}_{inertial} = v_{inertial}(t) \quad (8)$$

Additionally, provision of a real time clock within the sensor package 50 allows the sampled values to be time stamped prior to transmission such that changes in acceleration or rate of change of attitude can be accurately assess, the position and a given point in time determine and the path plotted.

A person of ordinary skill in the art will understand from FIG. 6 that the data collected by the sensor package located within the instrumented ball 38 can be used to tune different parameters of the mill 10 by adjusting the mill control 94. This would allow, for example, the tumbling speed of the mill 10 (among other parameters) to be managed in real time. The data provided by the instrumented ball 38 tumbling inside the mill 10 to the computer 60 can be used to adjust the tumbling speed of the mill 10 to improve the efficiency of the milling process.

As an improperly functioning gyroscopic sensor may skew some of the results observed, a calibration exercise is typically carried out prior to adding the instrumented ball 38 to a functioning mill. The calibration exercise comprises attaching the instrumented ball 38 to the drum 12 such that it follows a circular path at a set speed. The rotation rate of the drum 10 is then compared with the measurements of the gyroscopic sensors of the instrumented ball 38 and adjustments made accordingly.

The information gathered by the instrumented ball 38 can also be used to refine models used with a mill simulator by measuring data of the real internal mill 10 such as rotation rates and wear rates; by comparing derived quantities such as the rotational kinetic energy, forces and moments; by comparing regularly shaped grinding media versus irregularly shaped grinding media; and comparing the predicted simulated trajectories of ore in a mill with real life data. The same information may also be used as operational tool to verify the agreement between simulators and mills, to diagnose differences between the simulator and the mill 10, to track the ore particles in a mill and to examine the nature of the comminution via acoustic signatures. Moreover, it can also be used as a profiler by adapting the shape of the grinding media and keeping track of various wearing elements.

Although the present invention has been described hereinabove by way of specific embodiments thereof, it can be modified, without departing from the spirit and nature of the subject invention as defined in the appended claims.

What is claimed is:

1. A device for collecting data on an ore within a charged industrial mill charged with the ore, the device comprising:
 a casing defining an enclosed cavity and manufactured from a resilient material able to withstand stresses exerted by a working industrial mill;
 a sensor package disposed in said cavity, said package for detecting and sampling on an ongoing basis an acceleration and a rate of change in attitude of the object wherein said sensor package further comprises a wear sensor and wherein said sensor package detects and samples a wear of said casing on an ongoing basis;
 a real time clock disposed in said cavity for stamping said sampled acceleration and said sampled rate of change in attitude of the object with a sampling time; and
 a memory disposed in said cavity for storing said sampled acceleration, said sampled rate of change in attitude and said sampling time.

2. The device of claim 1, wherein said acceleration and said rate of change in attitude are sampled at discrete time intervals according to a predetermined sampling rate.

3. The device of claim 1, wherein said casing is spherical.

4. The device of claim 1, wherein said casing has a non-uniform rock-like shape.

5. The device of claim 4, wherein said rock-like shape is representative of a shape of the ore.

6. The device of claim 1, further comprising a communications port for transferring a contents of said memory to an external device.

7. The device of claim 6, wherein said communications port is a serial communications port.

8. The device of claim 7, wherein said serial communications port is a USB communications port.

9. The device of claim 6, wherein said communications port is a wireless communications port.

10. The device of claim 9, wherein said wireless communications port is an RF wireless communications port comprising a transmitter and an antenna.

11. The device of claim 1, wherein said sensor package comprises an inertial measurement unit within the cavity for detecting said acceleration and said rate of change of attitude of the object.

12. The device of claim 11, wherein said inertial measurement unit comprises three accelerometers for detecting said acceleration of the object, each accelerometer comprising a measuring axis, said accelerometers placed relative to one another such that said measuring axes are orthogonal.

13. The device of claim 11, wherein said inertial measurement unit comprises three gyroscopes for detecting said rate of change in attitude of the object, each gyroscope comprising a measuring axis, said gyroscopes placed relative to one another such that said measuring axes are orthogonal.

14. The device of claim 1, wherein said sensor package further comprises a corrosion sensor and wherein said sensor package detects and samples a corrosion of said casing on an ongoing basis.

15. The device of claim 1, wherein said sensor package further comprises a thermocouple and wherein said sensor package detects and samples a temperature of said casing on an ongoing basis.

16. The device of claim 1, wherein said sensor package further comprises a microphone and wherein said sensor package detects and samples an acoustic environment of the object on an ongoing basis.

17. A system for collecting data on an ore within an industrial mill charged with the ore, the system comprising:
 a computing device located outside the mill;
 at least one data collecting device placed in the mill, said data collecting device comprising:
  a casing defining an enclosed cavity, said casing manufactured from a resilient material able to withstand stresses exerted by a working industrial mill;
  a sensor package disposed in said cavity, said package for sampling on an ongoing basis an acceleration and a rate of change in attitude of the object wherein said sensor package further comprises a wear sensor and wherein said sensor package detects and samples a wear of said casing on an ongoing basis; and a real time clock disposed in said cavity for stamping said sampled acceleration and said sampled rate of change in attitude of the object with a sampling time; and a communications link between said at least one data collecting device; wherein said sampled acceleration, said sampled rate of change, said sampled wear, and said sampling time are transferred from said data collecting device to said computing device via said communications link.

18. The system of claim 17, further comprising a memory disposed in said cavity for storing at least one of said sampled acceleration, said sampled rate of change in attitude and said sampling time.

19. The system of claim 18, wherein a plurality of said sampled acceleration, said sampled rate of change and said sampling time are stored in said memory and further wherein said plurality are transferred together via said communications link.

20. The system of claim 18, wherein said communications link is a hardwired communications link.

21. The system of claim 17, wherein said communications link is a wireless communications link.

22. The system of claim 21, wherein said communications link is an RF communications link.

23. The system of claim 22, wherein said sampled acceleration, said sampled rate of change and said sampling time are transferred immediately after sampling from said data collecting device to said computing device via said RF communications link.

24. A method for estimating a path of travel of a durable object within an industrial mill charged with an ore during an estimation period, the method comprising:

a) determining an initial position of the object within the mill;

b) sampling an acceleration and rate of change of attitude of the object and stamping said detected acceleration and said rate of change of attitude with a sampling time;

c) predicting a future position of said object using said sampled acceleration and rate of change of attitude and said initial position;

d) plotting said future predicted position versus said sampling time;

e) replacing said initial position with said predicted future position; and e) repeating b), c), d) and e) repeatedly during the estimation period;

wherein said plotted predicted position versus sampling time provides the estimated path of travel of the object.

25. The method of claim 24, wherein the object defines an enclosed cavity and further comprising providing an inertial measurement unit within the cavity for detecting said acceleration and said rate of change of attitude.

26. The method of claim 25, wherein said inertial measurement unit comprises three accelerometers each comprising a measuring axis placed relative to one another such that said measuring axes are orthogonal.

27. The method of claim 25, wherein said inertial measurement unit comprises three gyroscopes each comprising a measuring axis placed relative to one another such that said measuring axes are orthogonal.

28. The method of claim 24, wherein said acceleration and said rate of change of attitude are sampled according to a predetermined sampling frequency.

* * * * *